United States Patent
Schmid et al.

(10) Patent No.: US 6,808,237 B2
(45) Date of Patent: Oct. 26, 2004

(54) METHOD AND DEVICE FOR CONTROLLING THE SUPPLY OF A PRESSURE MEDIUM ON RAIL VEHICLES (COMPRESSOR MANAGEMENT)

(75) Inventors: Ralf-Rainer Schmid, Vaterstetten (DE); Stefan Reinicke, München (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/415,832

(22) PCT Filed: Oct. 31, 2001

(86) PCT No.: PCT/EP01/12644
§ 371 (c)(1),
(2), (4) Date: May 2, 2003

(87) PCT Pub. No.: WO02/36407
PCT Pub. Date: May 10, 2002

(65) Prior Publication Data
US 2004/0018093 A1 Jan. 29, 2004

(30) Foreign Application Priority Data
Nov. 2, 2000 (DE) .......................................... 100 54 152

(51) Int. Cl.[7] .............................................. B60T 13/00
(52) U.S. Cl. .............................. 303/7; 303/128; 303/11
(58) Field of Search .................................. 303/7, 10, 11, 303/13, 14, 15, 16, 22.6, 128; 417/7, 8

(56) References Cited

U.S. PATENT DOCUMENTS

| | | | | |
|---|---|---|---|---|
| 4,502,842 A | * | 3/1985 | Currier et al. .................. | 417/8 |
| 4,580,947 A | * | 4/1986 | Shibata et al. .................. | 417/8 |
| 4,598,953 A | * | 7/1986 | Wood et al. .................... | 303/3 |
| 5,074,624 A | * | 12/1991 | Stauble et al. .................. | 303/3 |
| 5,108,263 A | * | 4/1992 | Blotenberg ..................... | 417/2 |
| 5,791,744 A | * | 8/1998 | Wood et al. .................... | 303/7 |
| 6,233,954 B1 | * | 5/2001 | Mehaffey et al. .............. | 417/4 |
| 6,419,454 B1 | * | 7/2002 | Christiansen .................. | 417/4 |

FOREIGN PATENT DOCUMENTS

| | | | |
|---|---|---|---|
| DE | 197 39 444 A1 | 9/1997 | |
| DE | 19837100 A1 | * 3/2000 | ........... F04B/49/02 |
| EP | 0 829 405 A2 | 9/1997 | |
| GB | 182333 | 7/1922 | |
| SU | 1 208 309 A | 1/1986 | |

* cited by examiner

Primary Examiner—Thomas Williams
(74) Attorney, Agent, or Firm—Barnes & Thornburg LLP

(57) ABSTRACT

The invention relates to a method for controlling the supply of a pressure medium on rail vehicles which are coupled together in a tractive link both mechanically and in order to enable the flow of said pressure medium, whereby said pressure medium is supplied by a main air container pipe which extends through all rail vehicles and which is fed with a pressure medium via a plurality of compressors individually mounted in each rail vehicle. The aim of the invention is to allow a balanced use of the compressors included in the tracture link. In order to achieve this, a changeable or fixed order of priority is defined for the compressors according to the total number of compressors in the tracture link, whereby the number of compressors activated depends on the order of priority necessary to meet the actual required amount of pressure medium.

18 Claims, 5 Drawing Sheets

METHOD AND DEVICE FOR CONTROLLING THE SUPPLY OF A PRESSURE MEDIUM ON RAIL VEHICLES (COMPRESSOR MANAGEMENT)

BACKGROUND AND SUMMARY OF THE INVENTION

The invention relates to a method for controlling the supply of a pressure medium on rail vehicles, as well as to a respective device.

The applicant's German Patent Document DE 198 48 995 A1 reveals a main air reservoir pipe which, conforming to standards, extends through all rail vehicles of a train formation and can be connected at the coupling points. This common pressure medium pipe is connected to the main air reservoirs, one on each rail vehicle. The main air reservoirs store the pressure medium in the form of compressed air which is required for the operation of braking devices as well as other pressure-medium-operated aggregates—such as door opening systems. In addition to the main air reservoir pipe, a second so-called main air pipe usually also extends through the train formation. However, this main air pipe fed by way of a train brake valve is used only for controlling the braking devices of the train formation, that is, for transmitting the braking signal. To this extent, the aggregates controlled by the main air pipe do not significantly contribute to the pressure medium consumption within the train formation.

For feeding the system of the main air reservoir pipe with respect to the pressure medium demand, compressors are customarily used. In a known manner, a compressor subjects air taken in from the atmosphere, by means of a mechanical driving energy, by compression to an excess pressure. The compressors, which are present in a decentralized manner on each individual rail vehicle of the train formation, are mutually connected with respect to the pressure medium by means of the common main air reservoir pipe.

The control of this pressure medium supply within the train formation can take place in a generally known manner by an independent decentralized pressure control. By means of a local pressure sensor assigned to each local compressor, the condition of a pressure medium requirement within the train formation can be determined. A pressure medium demand arises when the pressure in the main air reservoir pipe falls below a defined limit pressure. In this case, a switching device, connected on the input side with the local pressure sensor, switches on the local compressor in order to cover the pressure medium demand. The switching device will then switch the compressor off again when the reaching of an also defined maximal pressure is indicated by the pressure sensor. This so-called pressure monitor is thereby based on the principle of an on-off control.

The significant disadvantage of the known decentralized on-off control is the uncoordinated interaction of the compressors within the train formation. Although, as a result of the decentralization, a self-sufficient pressure medium supply is achieved for each rail vehicle which most easily allows a freely selectable mutual coupling of the rail vehicles, the resulting uncoordinated interaction leads to an increased wear of the compressors, which causes high expenditures with respect to maintenance and a shortened service life of the compressors. Thus, for example, tolerance differences in the pressure sensors in the reference system of the train formation may have the effect that always only a single compressor is used for meeting a low pressure medium demand occurring during the operation, whose assigned pressure monitor triggers at a limit pressure value which is still in the tolerance range but is minimal. During its entire service life, this compressor will then be stressed comparatively more frequently than the other compressors. This one-sided stressing of a compressor increases its wear, so that it also has to be serviced at shorter intervals.

On the other hand, in the event of a greater pressure drop below the limit value, all compressors are immediately switched on jointly in order to cover the arisen pressure medium demand. However, in most cases, an operation of all compressors is not necessary because even a few compressors can cause a maximal pressure within a very short time. The starting phase of all compressors in the case of a joint switch-on results in a high energy consumption as well as in unnecessary peak loads in the energy system of the train formation.

From European Patent Document EP 0 829 405 A2, a corresponding method as well as a corresponding device are known for controlling the pressure medium supply in the case of rail vehicles. Here, a synchronous admission of pressure medium to pressure pipe, which all compressors have in common, takes place by control valves which are controlled from a data bus.

From German Patent Document DE 198 37 100 A1, a system is known for controlling compressors of a train formation, in the case of which several compressors of a different capacity are provided which, corresponding to their capacity are actuated successively or individually, so that each respectively activated compressor operates at an optimal utilization ratio of the operating period to the rest period. A disadvantage of this solution consists of the fact that, for the refilling of a slight pressure difference, usually only the compressor with the lowest capacity is used, whereas the compressors with the higher capacities are less frequently actuated. This results in an enormous disproportion when used within a train formation.

It is therefore an object of the present invention to further improve the control of the pressure medium supply in the case of rail vehicles such that a utilization of the compressors existing in the train formation is achieved which is as balanced as possible in order to minimize particularly the wear and the energy consumption of the compressors.

The method of the invention includes, corresponding to the total number of compressors available in the train formation, a fixed or alternating priority sequence is defined for the compressors. Depending on the actual pressure medium demand, only that number of compressors will be caused to operate according to the sequence of their priority which are required for covering the actual pressure medium demand.

The advantage of the control method according to the invention for the compressors of the train formation is the demand-based on-and-off switching of the required compressors which is carried out as a function of the priority according to a fixed sequence which, however, is optionally freely changeable. A change of the priority sequence can take place under certain triggering conditions which will be explained in greater detail below. Since all compressors no longer contribute to the pressure medium supply in an equal manner, the on- and off-switching frequency can be significantly lowered, which minimizes wear and saves energy. In order to service, for example, a constant pressure medium consumption, the compressors with the highest priority run predominantly constantly at their optimal operating temperature, at which the wear is low. A low additional pressure compensation at operationally caused pressure fluctuations can then be carried out by the compressor with the next highest priority, which, however, is connected only as required.

For such a compensation of operationally caused pressure fluctuations in the main air reservoir pipe, in the event of a pressure drop below a defined low limit values, in addition to the already switched-on compressors, preferably first the compressor with the next higher priority is caused to operate. When a maximal pressure is reached, analogously, first the compressor with the next lower priority of the switched-on compressors is then caused to cease its operation. This control concept by means of two pressure limit values therefore follows the principle of the on-off control.

According to another measure improving the invention, when the operation of the pressure medium supply of the train formation is started, the compressors are switched on at different time delays. When the maximal pressure is reached, these are then switched off again at different time delays, the switching-on and off respectively taking place after the expiration of a time period defined as a function of the priority of each compressor. The time-related switch-on delay prevents a disadvantageous power peak in the energy consumption so that a dependable standing start of the compressors can take place—for example, when the pressure medium supply is actuated after an assembling of the train formation from individual rail vehicles.

For defining the priority sequence of the compressors, the compressors are preferably switched on at different individual lower limit pressures and are switched off again at different individual upper limit pressures. In this case, essentially the compressor with the highest priority is switched on first because of the largest lower limit pressure for a refill and, because of the largest upper limit pressure is switched off again last. The compressors which follow with respect to the priority being switched on and off respectively by, in each case, a next differential pressure value in an offset manner. In a simple fashion, this pressure staggering results in the priority sequence according to the invention for the compressors and permits a successive load-optimal approximation to the maximal pressure of the pressure medium supply. In addition, it is also conceivable to define the priority sequence of the compressors differently—for example, by a higher-ranking electronic control unit. In this case, the electronic control unit can be connected with the switching devices of all compressors for the controlling by a data bus extending through the train formation. The controlling of the pressure medium supply within the train formation can therefore take place in a centralized manner from a higher-ranking electronic control unit or in a decentralized manner by a control unit assigned to each compressor, in the latter case, a mutually coordinated adjustment being required. In the simplest case, the control unit may be constructed as a conventional pressure monitor on the compressor, which pressure monitor can be adjusted for setting its priority. By way of a common data bus, an advantageous master/slave assignment and therefore a centralization of the control can be achieved. In the simplest case, an electrical or mechanical manual selection switch or the like constructed directly on the compressor is suitable as the device for the decentralized defining of a priority sequence.

The priority sequence of the compressors may remain defined in an unchanged manner after the assembling of the rail vehicles to a train formation. However, a changeability of the priority sequence is particularly advantageous. Such a repriorization may take place in a fixedly or randomly time-controlled or pressure-controlled, temperature-controlled or moisture-controlled manner or in any other suitable manner. The change in the priority sequence of the compressors has the advantage of a uniform scattering of the wear and thus a particularly balanced utilization of all available compressors. Extremely varying maintenance intervals for compressor systems of the rail vehicles can thereby be avoided. The change of the priority sequence therefore provides a uniform rotation in the utilization frequency of the compressors in the train formation. Since, as a result, an extended stoppage of each compressor and therefore an absolute cooling is avoided, a wear-causing moisture release of compressors, which occurs in the warm-up phase, can be effectively prevented.

For a time-controlled change of the priority sequence during the operation of the pressure medium supply, preferably when a defined uninterrupted operating period is reached, the compressor with the highest priority is changed to the lowest priority and is therefore switched off. This compressor is replaced by a compressor with the next higher priority. In addition, other time-controlled changing methods are also conceivable. Thus, a change of the priority sequence can also be coupled to a fixed hour or date change as a triggering event.

In the case of an alternative pressure-controlled change of the priority sequence during the operation of the pressure medium supply, when a defined switch-over pressure value is reached within the main air reservoir pipe, the compressor with the highest priority can be changed to the lowest priority and can thereby be switched off. This compressor is again replaced by a still switched-off compressor with the next higher priority. In the simplest case, the switch-over pressure value triggering a change in the priority sequence, for example, after a significant pressure drop, can be caused by a braking of the train formation to a stoppage.

For an also conceivable temperature-controlled change of the priority sequence during the operation of the pressure medium supply, when the operating temperature is reached and after the expiration of a defined holding time, the compressor with the highest priority can be changed to the lowest priority and can therefore be switched off. This compressor, in turn, being replaced by a still switched-off compressor with the next higher priority. The temperature-controlled change therefore represents a measure aimed at the optimization of an operating mode of the compressors which is as dry as possible.

For an alternative moisture-controlled change of the priority sequence, during the operation of the pressure medium supply, the compressor with the highest priority is changed to the lowest priority when a dry operating condition is reached and is therefore switched off. This compressor being replaced by a still switched-off moist compressor with the next higher priority. This moisture-dependent control, which can be achieved by suitable sensors, therefore represents another conceivable possibility with a view to the optimization of an operating mode of the compressors which is as dry as possible.

In addition, other control methods for changing the priority sequence are also conceivable which relate to suitable parameters in the pressure medium supply, from which causes of wear can be derived. A mutual combination of several control methods is also conceivable.

These and other aspects of the present invention will become apparent from the following detailed description of the invention, when considered in conjunction with accompanying drawings.

DETAILED DESCRIPTION OF THE PREFERRED EMBODIMENTS

Figure 1:
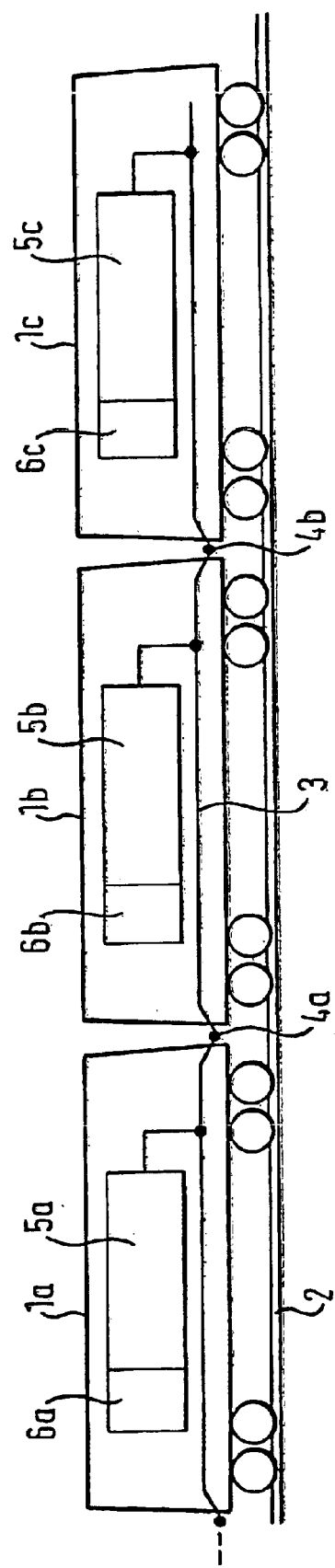
FIG. 1 is a schematic representation of a train formation with devices for the pressure medium supply according to the invention.

According to FIG. 1, a train formation consists of several rail vehicles, of which only three rail vehicles $1a$ to $1c$ are illustrated here as an example, which can be moved along on rails 2 and are mutually coupled mechanically. The pressure medium supply of the train formation, which is required particularly for the operation of the braking system, takes place by a main air reservoir pipe 3 extending through all rail vehicles $1a$ to $1c$ through the entire train formation. The main air reservoir pipe 3 is interconnected with respect to the pressure medium in sections at the connection points of adjacent rail vehicles $1a$ to $1b$ or $1b$ or $1c$ by way of pressure medium couplings $4a$ and $4b$ respectively. The admission of compressed air to the main air reservoir pipe 3 takes place by compressors $5a$ to $5c$ which are assigned to one rail vehicle $1a$ to $1c$ respectively and whose reservoir (not shown) is connected with the main air reservoir pipe 3. To this extent, each reservoir of the compressors $5a$ to $5c$ is short-circuited by the joint main air reservoir pipe 3, so that the same pressure level exists in this system. In this embodiment, each compressor $5a$ to $5c$ is equipped on the input side with a separate control unit $6a$ to $6c$, so that here a control of the compressors $5a$ to $5c$ takes place in a decentralized manner. The control units $6a$ to $6c$ include switching devices, which are not shown in greater detail, for switching the compressors $5a$ to $5c$ on and off as well as devices interacting therewith for determining a priority sequence for the compressors $5a$ to $5c$ within the train formation; here, for example, by means of a manually adjustable automatic pressure monitor. The control units $6a$ to $6c$ are connected with each other and the switching devices of all compressors by a data bus extending through the train (not shown).

Figure 2:
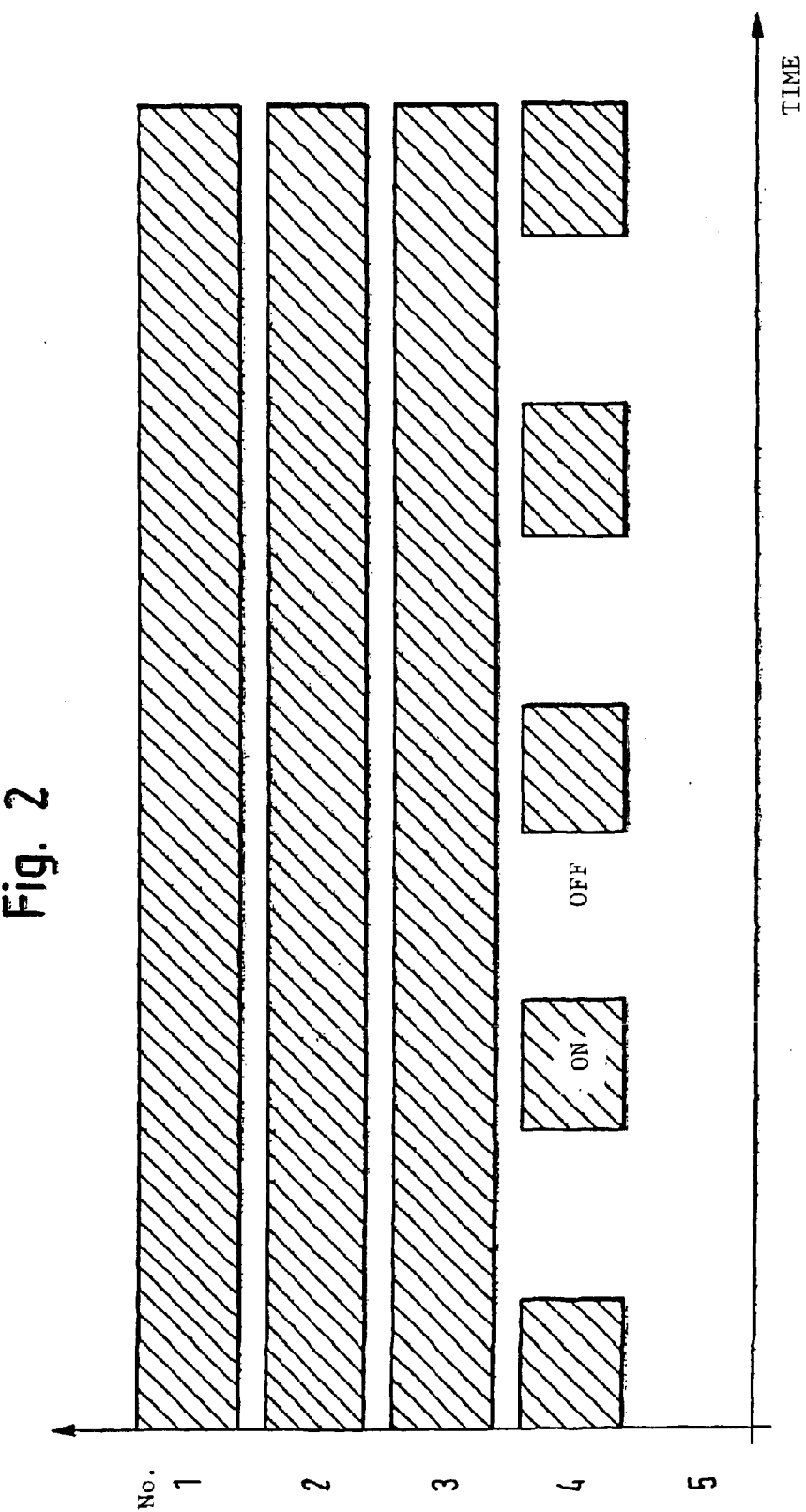
FIG. 2 is a consumption diagram of the pressure medium supply according to the invention in the case of an operationally caused constant pressure medium consumption.

By means of these devices of the control units $6a$ to $6c$, a control by a priority sequence, which is shown in FIG. 2, can be carried out. In this case, each compressor of the train formation receives a priority 1 to 5 as an identification (axis of the ordinate of the consumption diagram) which results in a priority sequence. As a function of the actual pressure medium demand, only that number of compressors is actuated according to the sequence of their priority 1 to 5 which is required for covering the actual pressure medium demand. In the examined example, a pressure medium consumption is assumed which is constant over time and the power of from 3 to 4 compressors is required to meet the demand. According to the priority-based control of the pressure medium supply, this demand is covered by a 100% operation of the compressors with the priority 1 to 3. The first three compressors are therefore continuously operated. The residual 40% demand is covered by the compressor with the next higher priority 4 which, viewed over time (axis of the abscissa of the consumption diagram) is actuated at 40% by switching-on and -off. The remaining compressor with the lowest priority 5 does not have to be used here. For the refilling of the—here constant—operationally caused pressure medium consumption, concretely at a resulting pressure drop below a defined lower limit value, in addition to the already switched-on compressors of priority 1 to 3, first the compressor with the next higher priority 4 is actuated. When a maximal pressure is reached, analogously first the compressor with the next lower priority 4 of the switched-on compressors of the priority 1 to 4 is stopped.

Figure 3:
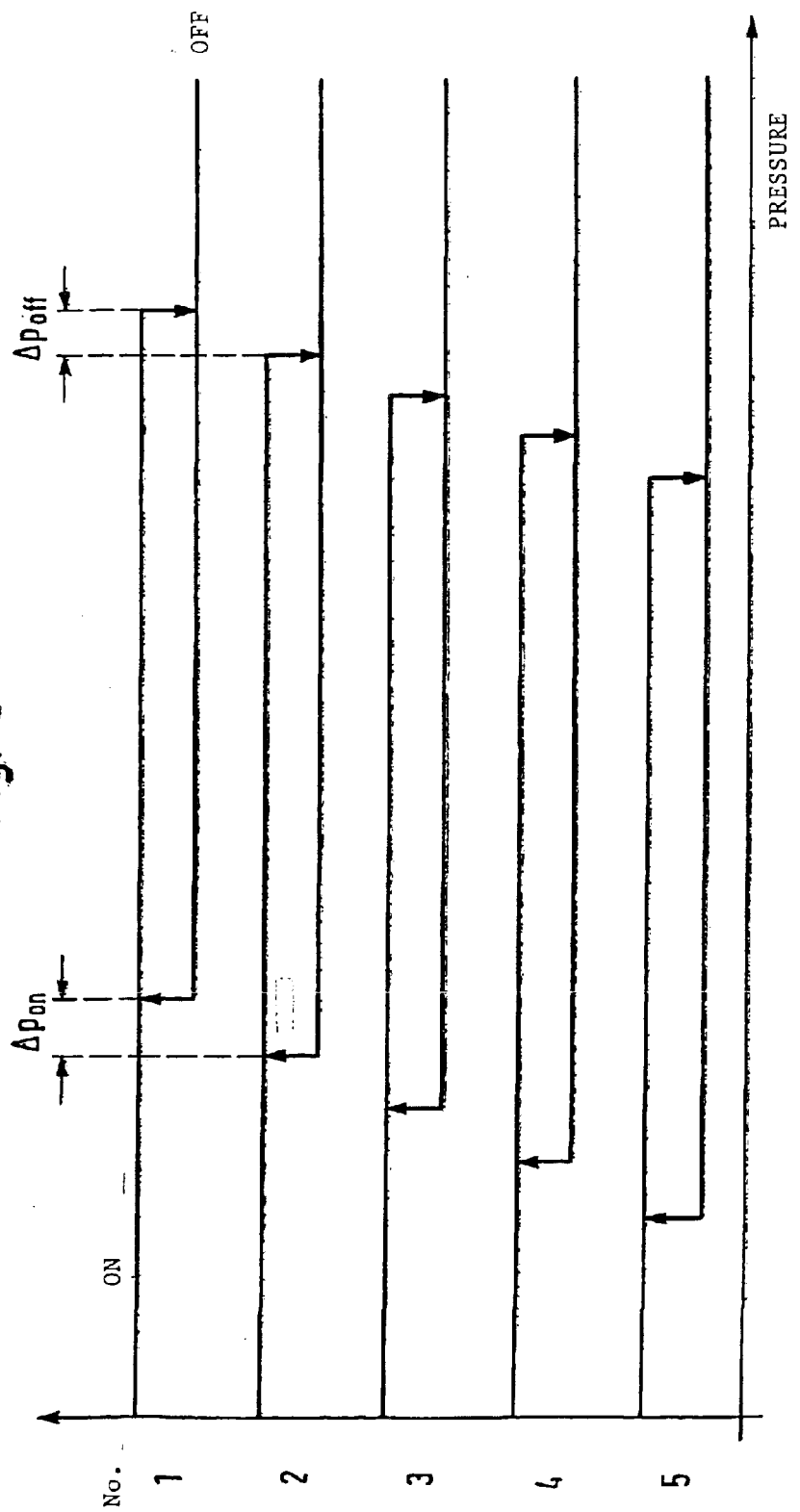
FIG. 3 is a switching diagram for illustrating a priority sequence created by staggered pressure values.

According to FIG. 3, for defining the priority sequence 1 ... 5 (axis of the ordinate of the switching diagram), the compressors are switched on at different individual lower limit pressures, which differ by the amount $\Delta p_{on}$ (axis of the abscissa of the switching diagram), during the operation for the refilling. Analogously thereto, the compressors are switched off also at different individual upper limit pressures which differ by the amount $\Delta p_{off}$. When the operation is started without pressure, however, a filling first takes place while using all compressors until the pressure reaches the smallest upper limit pressure of the compressor with priority 5. As a result of their upper limit pressures, which differ by the amount $\Delta p_{off}$, the compressors switch off in steps. The compressor with priority 1 switches off last. This is illustrated by the ton "on" line for each of the priorities. When refilling from a low dropping pressure during the operation, the compressor with the highest priority 1 is switched on again first. It has the largest lower limit pressure. The compressors following in the priority 2 to 5 are switched on in an offset manner by, in each case, a next lower differential pressure value step of the amount $\Delta p_{on}$, if this is required for a refilling with pressure medium as the pressure drops. This is shown by the bottom line "off" in each of the priorities.

Figure 4:
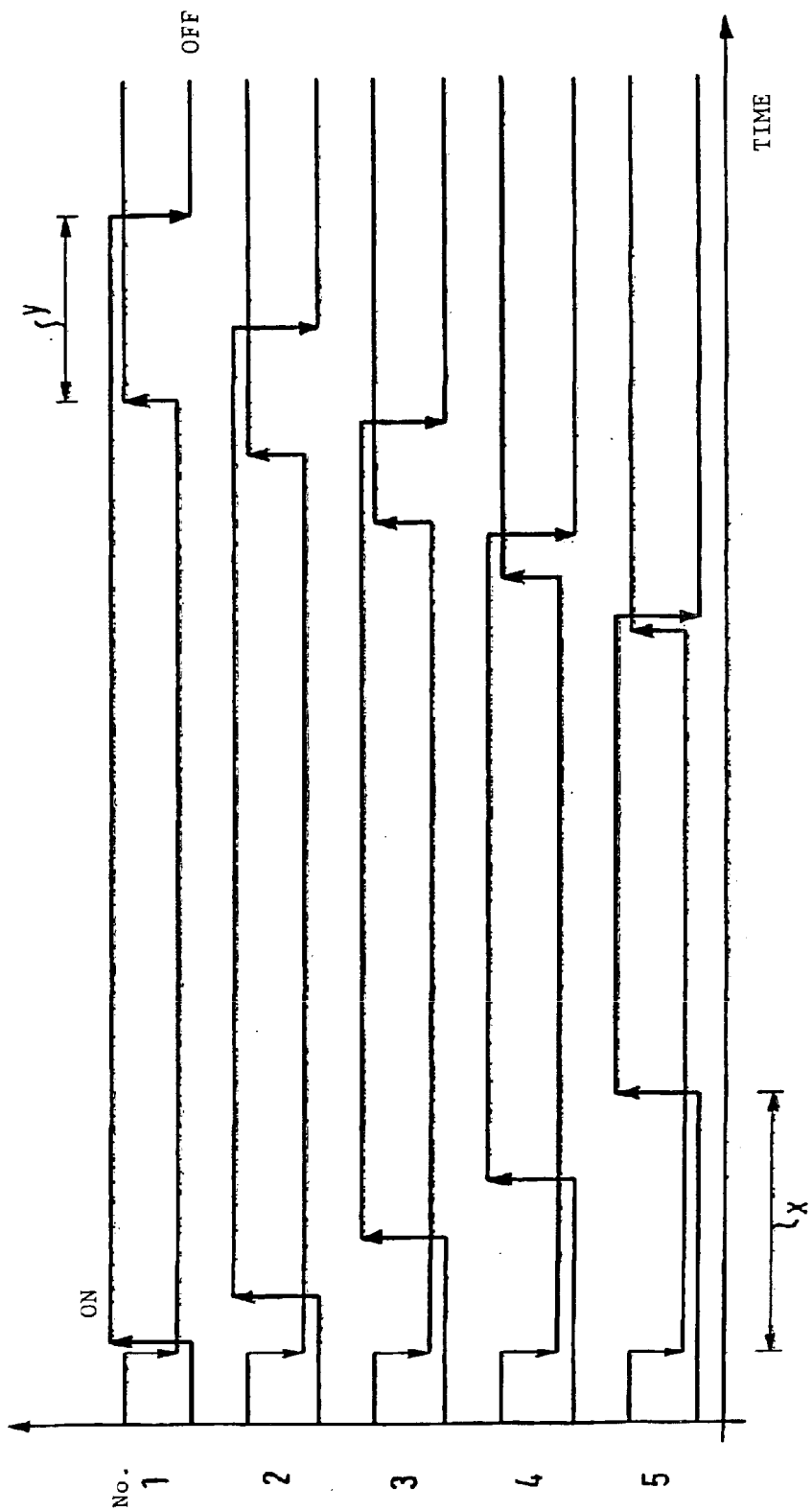
FIG. 4 is a switching diagram for illustrating a time-staggered delay during the on- and off-switching of the compressors.

When the operation of the pressure medium supply is started, according to FIG. 4, the compressors of the train formation are switched on in a differently time-delayed manner in order to avoid power peaks in the energy supply of the compressors, which is a result of the individually different amount of the switch-on time delay x (adjacent to the axis of the ordinate of the switching diagram). Analogous thereto, when the maximal pressure is reached, the compressors are switched off again by an individually different amount of a switch-off time delay y.

In this case, a switching on or off takes place after the expiration of an individual time period defined as a function of the priority 1 to 5 of each compressor in order to create a priority-dependent staggering to this extent.

So that a one-sided stressing of compressors with higher priorities 1, 2, among others, a rotating change of the priority sequence of the compressors takes place. For a time-controlled change of the priority sequence during the operation of the pressure medium supply, when a defined uninterrupted operating duration is reached, the compressor with the highest priority 1 can be changed to the lowest priority and can therefore be switched off if it is not needed. The other compressors move along correspondingly with respect to their priority.

Figure 5:
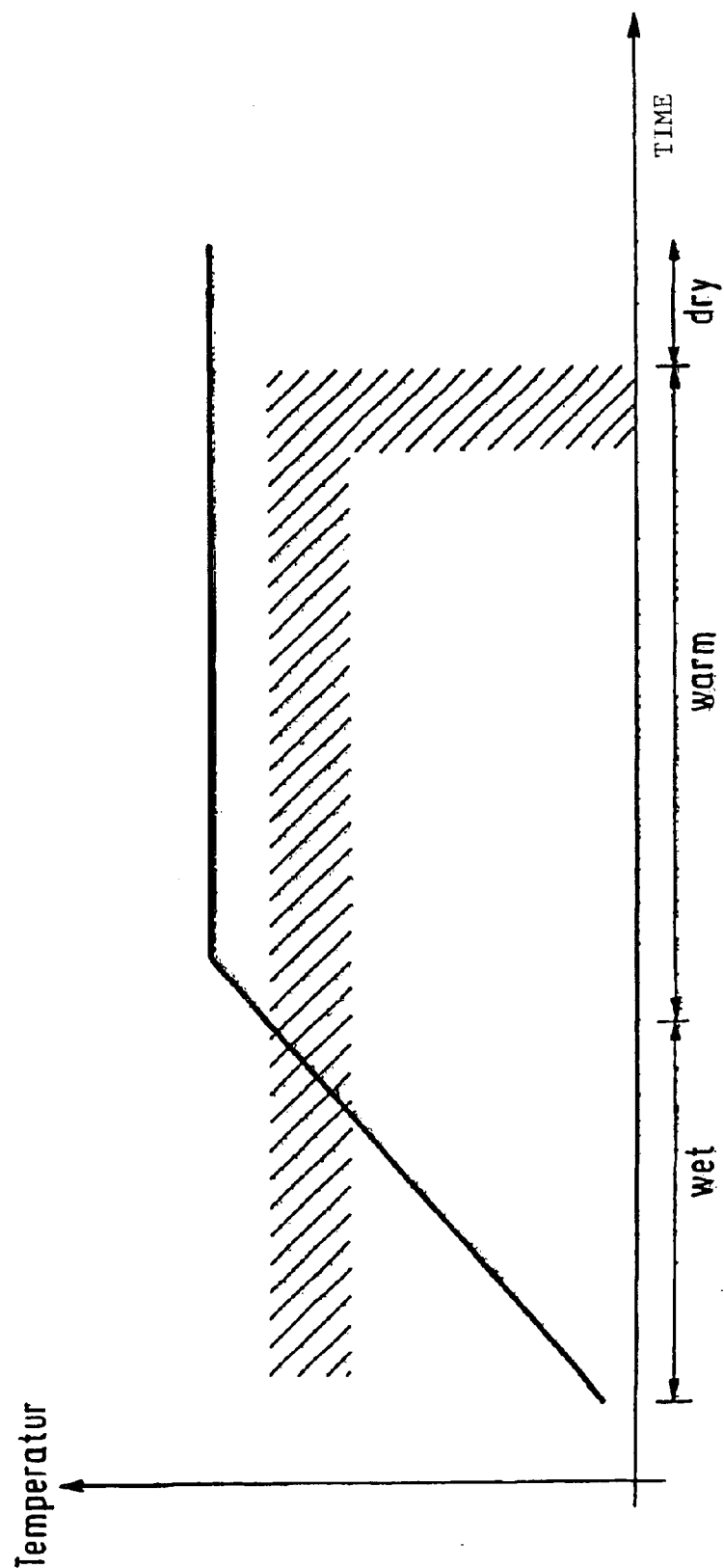
FIG. 5 is a typical drying diagram of a compressor.

With reference to FIG. 5, in the case of this time-controlled change of the priority sequence, the operating duration of a compressor can be defined at least by means of the time which the compressor requires for changing from a wet warm-up phase "wet" by way of a warm phase "warm" to a dry condition "dry." As a result, all compressors in the train formation can be kept dry which counteracts the wear of the pressure supply system as a result of moisture. A moisture release (hatching) of the compressor takes place by way of the warm-up phase "wet" and the warm phase "warm."

The invention is not limited to the above-described preferred embodiment. On the contrary, modifications of this embodiment are also conceivable which, despite a construction of a different design, intrude into the scope of protection defined by the claims. In particular, the invention is not limited to a time-controlled change of the priority sequence. This change may also take place in a pressure-controlled, temperature-controlled, moisture-controlled or any other suitable manner. Furthermore, different centralized or decentralized control modes are also conceivable for defining the priority sequence.

Although the present invention has been described and illustrated in detail, it is to be clearly understood that this is done by way of illustration and example only and is not to be taken by way of limitation. The scope of the present invention is to be limited only by the terms of the appended claims.

What is claimed is:

1. A method for controlling the supply of a pressure medium on rail vehicles, which are mutually coupled mechanically and with respect to the pressure medium within a train formation, the pressure medium supply being implemented by a common main air reservoir pipe which extends through all rail vehicles and which is fed with a pressure medium by several compressors individually, one in each rail vehicle, the method comprising:
corresponding to the total number of compressors available in the train formation, defining a priority sequence for the compressors independent of the capacity of the individual compressors;
as a function of the actual pressure medium demand, actuating only that number of compressors being required, according to the sequence of their priority, for covering the actual pressure medium demand; and
changing the priority sequence of the compressors in at least one of a fixedly or randomly time-controlled, pressure-controlled, temperature-controlled and moisture-controlled manner.

2. The method according to claim 1, wherein for refilling operationally caused pressure medium consumptions in the event of a related pressure drop in the main air reservoir pipe below a defined lower limit value, in addition to the already switched-on compressors, first the compressor with the next higher priority is actuated; and, when a maximal pressure is reached, first the switched-on compressor with the next lower priority is switched off again.

3. The method according to claim 1, wherein when the pressure medium supply of the train formation is actuated, the compressors are switched on in a time-delayed manner and, when the maximal pressure is reached, are switched off again in a time-delayed manner, the switching on and off respectively taking place after the expiration of a time period defined as a function of the priority of each compressor.

4. The method according to claim 1, wherein, for defining the priority sequence of the compressors, the compressors are switched on at different individual lower limit pressures and are switched off at different individual upper limit pressures.

5. Method according to one of the preceding claims, characterized in that the controlling of the pressure medium supply within the train formation takes place in a centralized manner from a higher ranking control unit or, in a decentralized manner, by a control unit assigned to each compressor.

6. Method according to one of the preceding claims, characterized in that the actual pressure medium demand of the train formation is determined by means of the pressure in a common main air reservoir pipe which is looped through all rail vehicle vehicles.

7. The method of claim 4, wherein, as a result of the largest lower limit pressure, the compressor with the highest priority is switched on first for refilling, and the compressors which follow with respect to their priority being switched on sequentially and offset by one next lower differential pressure value.

8. The method according to claim 7, wherein, as a result of the smallest maximal pressure, the compressor with the lowest priority is switched off first and the compressors follow with respect to their priority being switched off sequentially and offset by one next higher differential pressure value.

9. The method according to claim 1, wherein, for a time-controlled change of the priority sequence during the operation of the pressure medium supply, a compressor with the highest priority is changed to the lowest priority when a defined uninterrupted operating period is reached and is therefore switched off and this switched-off compressor is replaced by a still switched-off compressor with the next higher priority.

10. The method according to claim 1, wherein, for a moisture-controlled change of the priority sequence during the operation of the pressure medium supply, a compressor with the highest priority is changed to the lowest priority when a dry operating condition is reached and is therefore switched off; and this switched-off compressor is replaced by a still switched-off wet compressor.

11. A method for controlling the supply of a pressure medium on rail vehicles, which are mutually coupled mechanically and with respect to the pressure medium within a train formation, the pressure medium supply being implemented by a common main air reservoir pipe which extends through all rail vehicles and which is fed with a pressure medium by several compressors individually, one in each rail vehicle, the method comprising:
corresponding to the total number of compressors available in the train formation, defining a priority sequence for the compressors;
as a function of the actual pressure medium demand, actuating only that number of compressors being required, according to the sequence of their priority, for covering the actual pressure medium demand; and
changing the priority sequence of the compressors for a pressure-controlled change of the priority sequence during the operation of the pressure medium supply, wherein a compressor with the highest priority is changed to the lowest priority when a defined switchover pressure value within the main air reservoir pipe is reached and is therefore switched off; and this switched-off compressor is replaced by a still switched-off compressor with the next higher priority.

12. A method for controlling the supply of a pressure medium on rail vehicles, which are mutually coupled mechanically and with respect to the pressure medium within a train formation, the pressure medium supply being implemented by a common main air reservoir pipe which extends through all rail vehicles and which is fed with a pressure medium by several compressors individually, one in each rail vehicle, the method comprising:

corresponding to the total number of compressors available in the train formation, defining a priority sequence for the compressors;

as a function of the actual pressure medium demand, actuating only that number of compressors being required, according to the sequence of their priority, for covering the actual pressure medium demand;

changing the priority sequence of the compressors for a temperature-controlled change of the priority sequence during the operation of the pressure medium supply, wherein a compressor with the highest priority is changed to the lowest priority when the operating temperature is reached and after the expiration of a defined holding time and is therefore switched off; and this switched-off compressor is replaced by a still switched-off compressor with the next higher priority.

13. A device for controlling the supply of a pressure medium on rail vehicles, which are mutually coupled mechanically and with respect to the pressure medium within a train formation, and the pressure medium supply takes place by a common main air reservoir pipe extending through all rail vehicles, which main air reservoir pipe is connected at the coupling points of the rail vehicles by pressure medium couplings in sections, and is fed with a pressure medium by several compressors, an assigned compressor being provided essentially in each rail vehicle (1$a$ to 1$c$); the device further comprises:

devices for defining a priority sequence for the compressors based on the total number of compressors available in the train formation and independent of the capacity of the individual compressors;

as a function of the actual pressure medium demand, switching devices actuating only that number compressors according to the sequence of their priority, which are required for covering an actual pressure medium demand; and the devices for determining a priority sequence changing the priority sequence of the compressors in a fixedly or randomly time-controlled, temperature-controlled or moisture-controlled manner.

14. The device according to claim 13, wherein, for determining the actual pressure medium demand of the train formation, a single pressure sensor is provided and arranged in one of the common main air reservoir pipe looped through all rail vehicles and at a reservoir of a compressor is provided.

15. The device according to claim 13, wherein the devices for defining a priority sequence are constructed in one of a centralized and decentralized manner and one of electrical or mechanical manual selection switch manner.

16. The device according to claim 13, wherein the devices for defining a priority sequence are constructed as one of a centralized and a decentralized electronic control unit.

17. The device according to claim 16, wherein the electronic control unit is connected, by a data bus extending through the train formation, with the switching devices of all compressors.

18. The device according to claim 13, wherein the switching devices of the compressors are constructed in the manner of an adjustable automatic pressure monitor.

* * * * *